(No Model.) 6 Sheets—Sheet 1.
G. T. PILLINGS.
MACHINE FOR CUTTING CAN BODY BLANKS.
No. 288,733. Patented Nov. 20, 1883.
- FIG I -
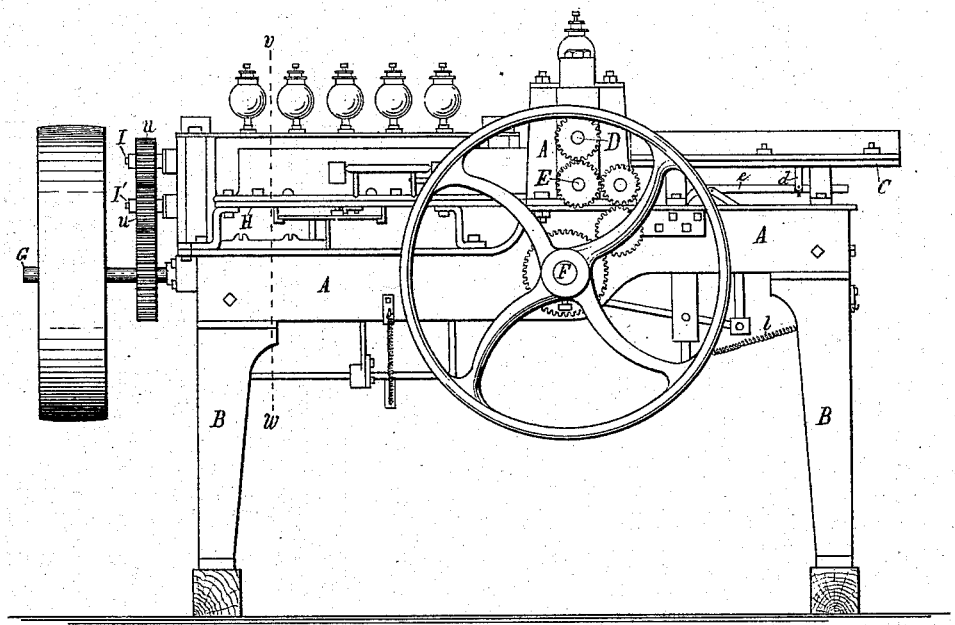
- FIG II -
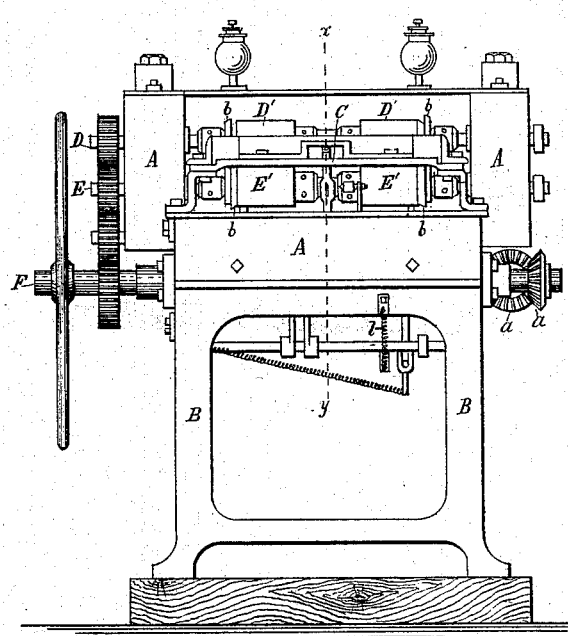
WITNESSES
Danl Fisher
Ed. J. Diggs
INVENTOR
George T. Pillings,
by G.H.H.T. Howard,
Atty.

(No Model.) 6 Sheets—Sheet 2.
G. T. PILLINGS.
MACHINE FOR CUTTING CAN BODY BLANKS.
No. 288,733. Patented Nov. 20, 1883.
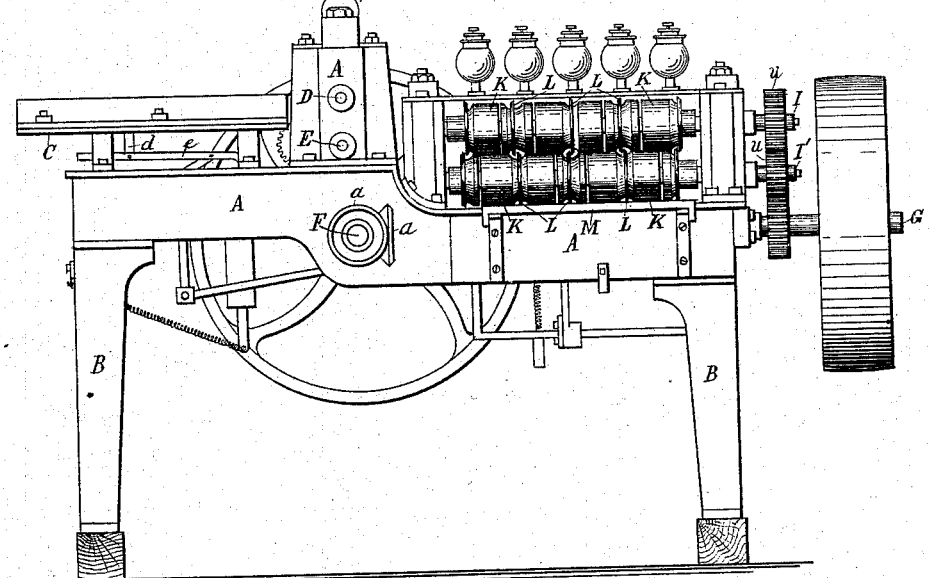
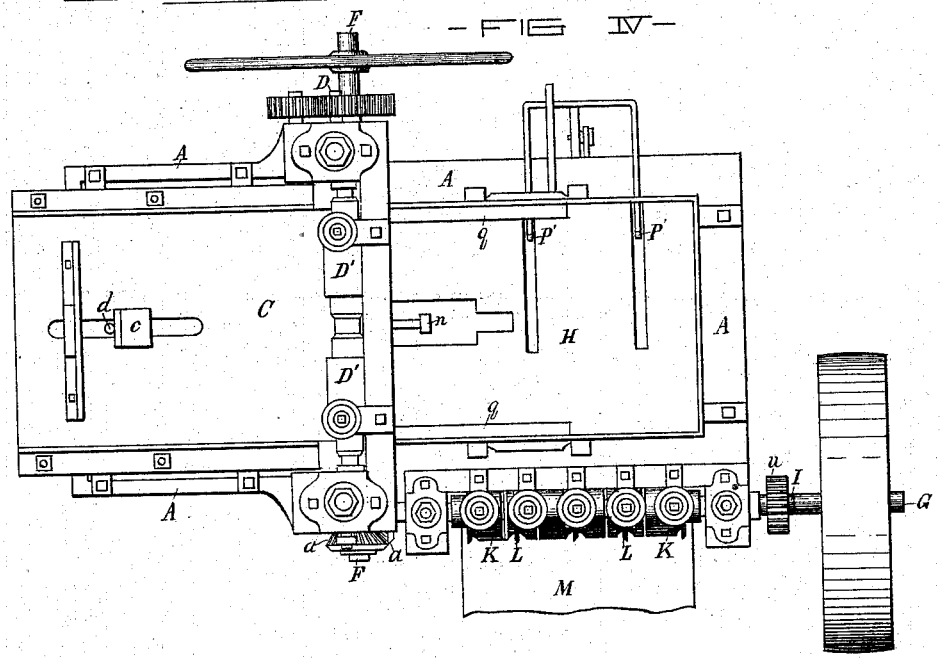

(No Model.)  6 Sheets—Sheet 3.
G. T. PILLINGS.
MACHINE FOR CUTTING CAN BODY BLANKS.
No. 288,733.  Patented Nov. 20, 1883.
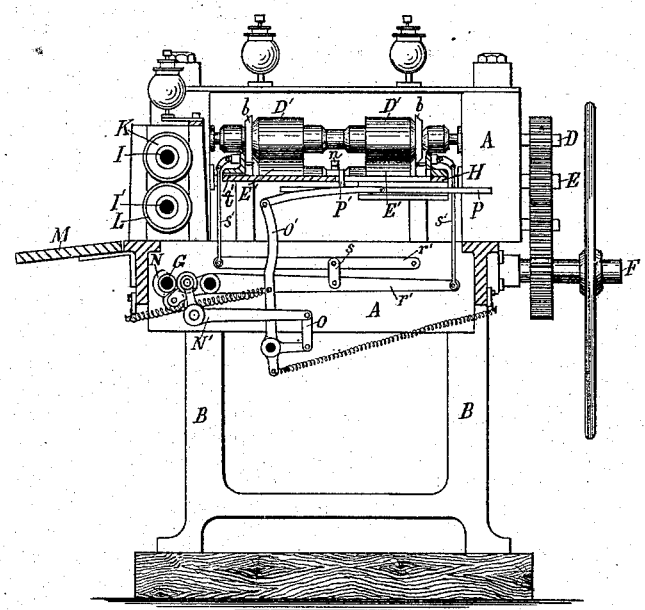
—FIG V—
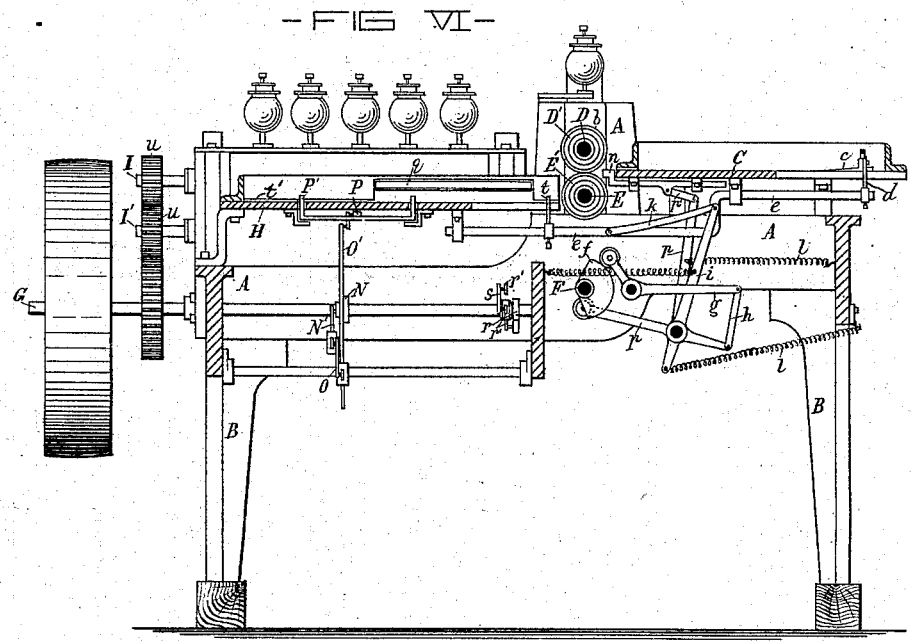
—FIG VI—
WITNESSES  
Paul Fisher  
Ed. J. Diggs
INVENTOR  
George T. Pillings  
by G.H. & H.T. Howard,  
Attys.

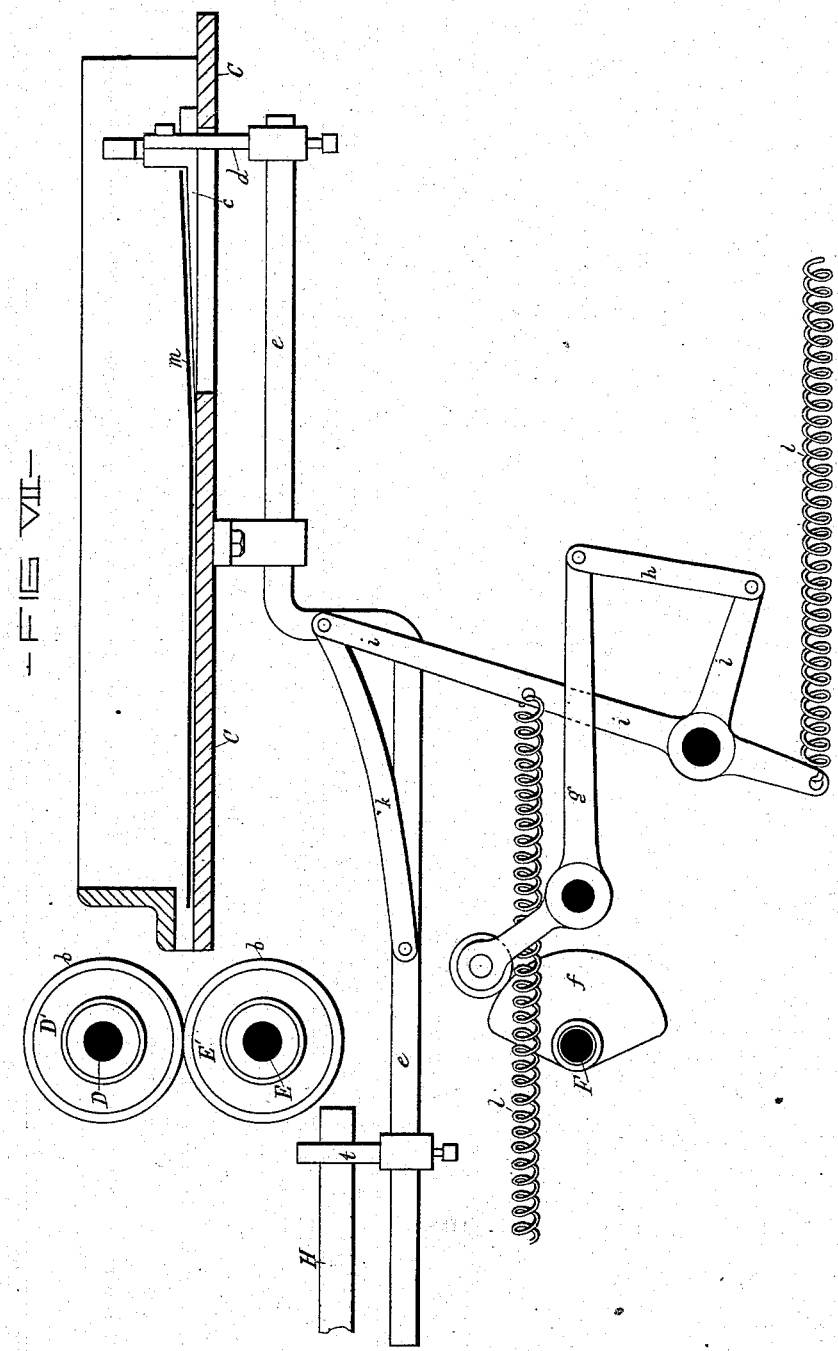

(No Model.) 6 Sheets—Sheet 5.
G. T. PILLINGS.
MACHINE FOR CUTTING CAN BODY BLANKS.
No. 288,733. Patented Nov. 20, 1883.
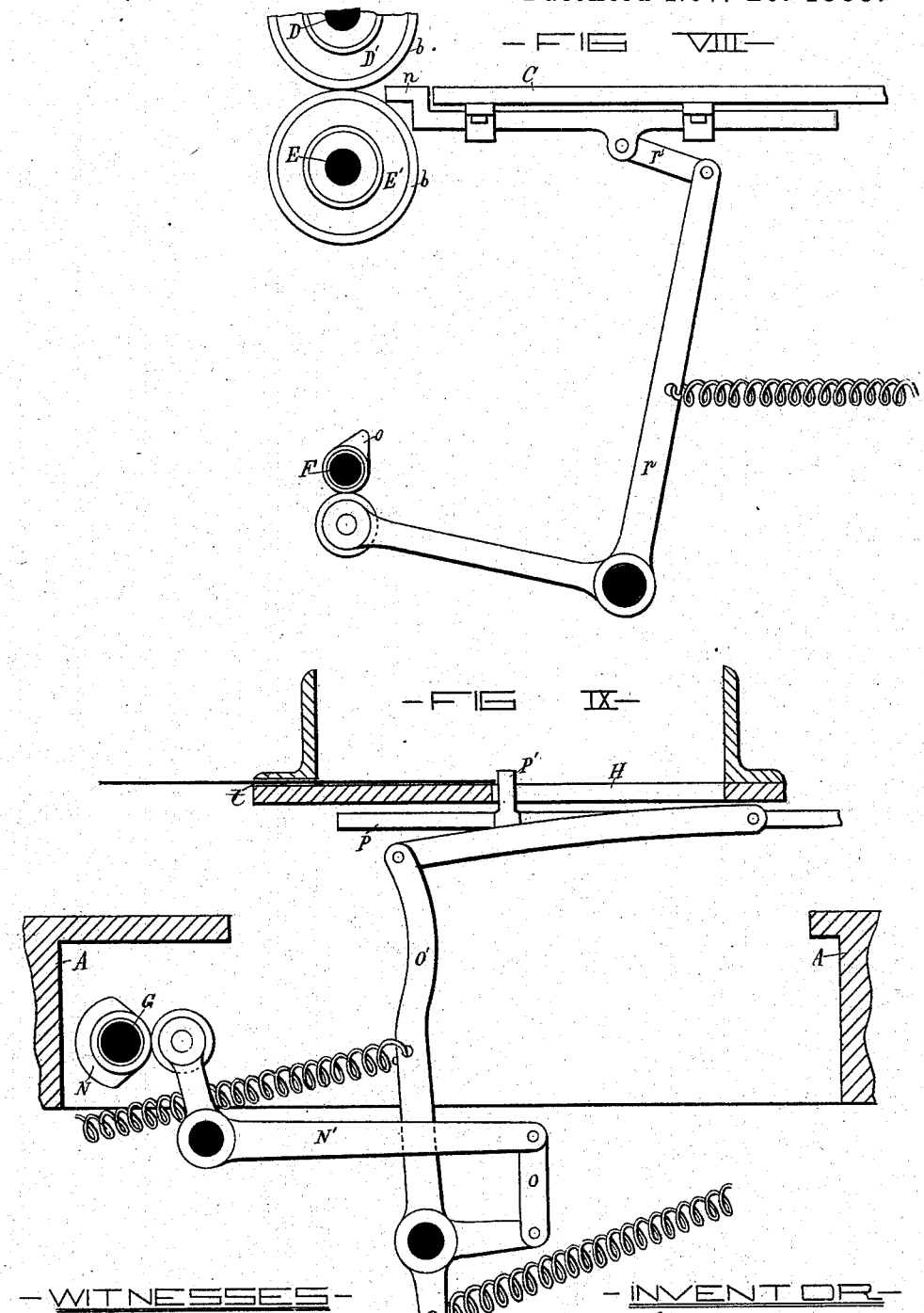

(No Model.) 6 Sheets—Sheet 6.
G. T. PILLINGS.
MACHINE FOR CUTTING CAN BODY BLANKS.
No. 288,733. Patented Nov. 20, 1883.
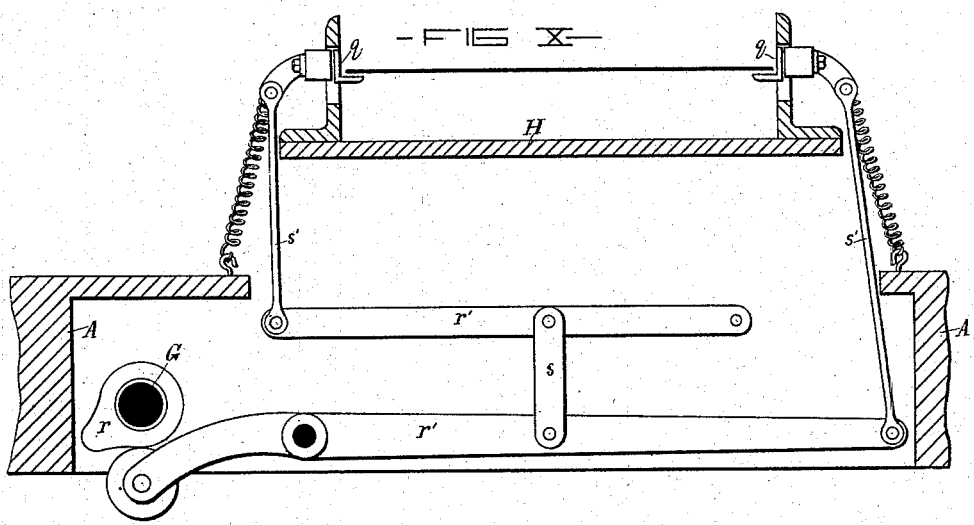
WITNESSES
Danl. Fisher
Ed. J. Diggs
INVENTOR
George T. Pillings,
by H. H. T. Howard,
attys.

UNITED STATES PATENT OFFICE.

GEORGE T. PILLINGS, OF BALTIMORE, MARYLAND.

MACHINE FOR CUTTING CAN-BODY BLANKS.

SPECIFICATION forming part of Letters Patent No. 288,733, dated November 20, 1883.

Application filed October 5, 1882. (No model.)

*To all whom it may concern:*

Be it known that I, GEORGE T. PILLINGS, of the city of Baltimore, and State of Maryland, have invented certain Improvements in a Machine for Reducing Sheets of Tin-Plate to Can-Body Blanks, of which the following is a specification.

The object of this invention is to provide a machine for cutting sheets of tin-plate into blanks for can-bodies, the sheet being fed to one end of the machine and delivered at the other in the form of body-blanks.

In the description of my said invention which follows reference is made to the accompanying drawings, forming a part hereof, and in which—

Figure I is an exterior side view of the machine. Fig. II is an exterior end view of the same. Fig. III is a side view the reverse of Fig. I. Fig. IV is a plan of the invention. Fig. V is a transverse section of Fig. I, taken on the dotted line $v\ w$. Fig. VI is a longitudinal section of Fig. II, taken on the dotted line $x\ y$. Figs. VII, VIII, IX, X show details of the invention on an enlarged scale.

Similar letters of reference indicate similar parts in all the views.

A is the frame of the machine, having suitable legs, B.

C is a table upon which the sheet of tin-plate to be cut into body-blanks is placed.

D and E are shafts or spindles extending transversely of the machine, and supported in bearings forming a part of the frame A. These shafts are geared together so as to revolve in opposite directions, and also to a second shaft, F, which is actuated from the main driving-shaft T, through the medium of miter-gears $a$. The shafts D and E are provided, respectively, with rolls D' and E', of iron or steel, turned to give a smooth face, and also with the rotary cutters $b\ b$.

It will be seen that a sheet of tin-plate placed on the table C and fed to the rolls D' and E' will be carried between them, straightened, and delivered on the other side, of a parallel width, the superfluous edges being trimmed from the sheet by the action of the rotary cutters $b$. To effect the feed of the sheet to the rolls D' and E', the table C is provided with a wedge-shaped slide, $c$, upon which the rear end of the sheet rests. This slide is connected by an arm, $d$, to a longitudinally-moving bar, $e$, which is suitably sustained underneath the table C. The bar $e$ receives its motion from a cam, $f$, through the medium of the lever $g$, link $h$, lever $i$, and second link, $k$. This mechanism, together with other parts of the machine, is shown on an enlarged scale in Fig. VII, and by referring to that figure it will be seen that the forward movement is effected by means of springs $l$, the backward motion only being derived exclusively from the cam. The sheet of tin-plate is represented by $m$. As the rear end of the trimmed sheet passes from the rolls D' and E' and cutters $b\ b$ it is forced forward by means of a sliding bar, $n$, which is moved by means of a second cam, $o$, through the medium of a lever, $p$, and a short link, $p'$. This mechanism is shown on an enlarged scale in Fig. VIII. As the trimmed sheet is delivered from the rolls D' and E' it is caught by a pair of hinged supports, $q$, and suspended directly over a second table, H, until a second sheet is fed to the rolls and cutters D' and E' and $b\ b$, when the hinged supports $q$ are tilted and the first sheet allowed to fall to the second table, H. The devices for effecting the tilting of the hinged supports $q$ consist of a third cam, $r$, levers $r'$, connected by a link, $s$, and connecting-rods $s'$, attached at their upper end to the said hinged supports. (See Fig. X.) Upon the trimmed sheet falling to the second table it is caught by an arm, $t$, on the bar $e$, (see Fig. VII,) and carried to the extreme end of the table H. It is next moved transversely of the said table, and through a slot, $t'$, in the raised side thereof (shown in Figs. V and VI) to a second set of rolls and cutters, similar in construction to those before described, fastened to shafts I and I', which are geared together and to the main driving-shaft. The gears are represented by $u$. The upper and lower rolls and the cutters of the second series are respectively represented by K and K and L and L, and they are arranged to slit the tin into as many pieces as the sheet will allow, each piece representing a body-blank. The body-blanks are finally delivered to a board or table, M, in piles.

The contrivances for effecting the lateral or transverse movement of the trimmed sheet to the slitting-rolls and cutters are shown in Fig. IX on an enlarged scale; and they consist of a fourth cam, N, on the main driving-shaft G, a lever, N', a link, O, connecting the said lever to a lever, O', and a rod which communicates the motion from the end of the lever O' to a sliding bar, P, carrying an arm, P', which comes in contact with the edge of the tin-plate. In all cases where levers are used in connection with cams I employ springs to keep the rolls in the vibratory arms in contact with the periphery of the said cams, and also arrange the mechanism so that the sheet is carried forward by the springs, and the return motion effected by the cams. By this means the sheets cannot be easily broken, as any irregularity in feed is compensated for by the resilient action of the springs, the backward movement only being without self-adjustment.

It will be understood that in the slitting of the sheet into bodies it is simultaneously trimmed at each end to the proper length; consequently the end body-blanks correspond in width with the others.

I am aware that machines have been made to square sheets of metal, in which the sheets are passed between rotary cutters set at a right angle with reference to each other, and such a machine I do not claim, broadly; but What I do claim is—

In a machine for reducing sheets of tin-plate to can-body blanks, a pair of shafts with rolls having uniform inflexible faces and rotary cutters secured thereon, substantially as shown and described, the said shafts being arranged one above the other and connected by gearing, combined with a similar pair of shafts with rolls, rotary cutters, and gearing thereon, situated on a lower plane, and at practically a right angle with reference to the first series; mechanism to revolve the two sets of shafts and their attachments; feeding mechanism to conduct the uncut sheets to the first series of cutters; devices to receive and drop the trimmed sheets to a table, and other mechanism to carry the said trimmed sheets transversely to the second series of rolls and cutters, all combined substantially as specified.

GEORGE T. PILLINGS.

Witnesses:
ED. J. DIGGS,
WM. T. HOWARD.